United States Patent
Groening

(10) Patent No.: US 7,671,501 B2
(45) Date of Patent: Mar. 2, 2010

(54) ELECTRICAL MACHINE WITH TORQUE LIMITATION

(75) Inventor: Ingolf Groening, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 11/958,679

(22) Filed: Dec. 18, 2007

(65) Prior Publication Data

US 2008/0150381 A1    Jun. 26, 2008

(30) Foreign Application Priority Data

Dec. 20, 2006   (DE)   ................ 10 2006 060 987

(51) Int. Cl.
   *H02K 16/00*   (2006.01)
(52) U.S. Cl. ...................... 310/114; 310/266
(58) Field of Classification Search .......... 310/86, 310/103–104, 266, 112–114, 261, 267
   See application file for complete search history.

(56) References Cited

U.S. PATENT DOCUMENTS

| | | | | |
|---|---|---|---|---|
| 4,137,473 A | * | 1/1979 | Pfister | 310/98 |
| 4,396,849 A | * | 8/1983 | Taiani | 310/92 |
| 4,550,283 A | * | 10/1985 | Leach et al. | 322/48 |
| 5,828,148 A | * | 10/1998 | Niggemann et al. | 310/86 |
| 5,986,370 A | * | 11/1999 | Cheng | 310/77 |
| 6,787,945 B2 | * | 9/2004 | Miyata | 310/12.01 |
| 6,847,726 B2 | * | 1/2005 | Button et al. | 381/401 |
| 7,501,733 B2 | * | 3/2009 | Takeuchi | 310/156.35 |
| 2005/0057111 A1 | * | 3/2005 | Han et al. | 310/166 |
| 2005/0067909 A1 | * | 3/2005 | Ahn et al. | 310/179 |
| 2006/0071575 A1 | * | 4/2006 | Jansen et al. | 310/266 |

FOREIGN PATENT DOCUMENTS

DE        1850245        4/1962

* cited by examiner

*Primary Examiner*—Thanh Lam
(74) *Attorney, Agent, or Firm*—Michael J. Striker

(57) ABSTRACT

An electrical machine with torque limitation which is only slightly larger structurally than an identical machine without torque limitation and is thus as compact as possible has a stator with windings and a rotor supported movably relative to the stator, recesses distributed over the circumference and extending axially are present on the rotor surface, and a driver, located coaxially relative to the rotor and extending axially, is located in the air gap between the rotor and the stator, and exciter magnets on the upper driver face toward the stator and driver magnets on the inner driver face toward the rotor are located in such a way that upon rotation of the driver, the rotor is likewise capable of being set into rotation as a result of the rotary field generated by the windings and by the driver magnets.

8 Claims, 2 Drawing Sheets

ELECTRICAL MACHINE WITH TORQUE LIMITATION

CROSS-REFERENCE TO A RELATED APPLICATION

The invention described and claimed hereinbelow is also described in German Patent Application DE 10 2006 060 987.5 filed on Dec. 20, 2006. This German Patent Application, whose subject matter is incorporated here by reference, provides the basis for a claim of priority of invention under 35 U.S.C. 119(a)-(d).

BACKGROUND OF THE INVENTION

The invention relates to an electrical machine and its use as a motor or generator, as generically defined by the independent claim.

Electric motors with a stator and rotor are known from the prior art. As a rule, the stator includes a winding with the aid of which a magnetic rotary field is generated which sets the rotor, equipped with permanent magnets, into rotation. The rotor shaft as a rule serves as a power takeoff means and can for instance drive a device located on the rotor shaft. To limit the torque exerted by the rotor shaft, mechanical slip couplings are known, of the kind also described in German Utility Model DE 1850245 U. A slip coupling of this kind has the disadvantage that because of the mechanical embodiment, it is highly likely to wear and requires a large amount of space, which makes it difficult to attain an electrical drive that is as compact as possible.

SUMMARY OF THE INVENTION

It is the object of the invention to construct an electrical machine with torque limitation which requires only slightly more space than an identical machine without torque limitation and is thus as compact as possible.

This object is attained by means of an electrical machine, having a stator with windings and having a rotor supported movably relative to the stator; recesses distributed over the circumference and extending axially are present on the rotor surface, and a driver, located coaxially relative to the rotor and extending axially, is located in the air gap between the rotor and the stator, and exciter magnets on the upper driver face toward the stator and driver magnets on the inner driver face toward the rotor are located in such a way that the rotor upon rotation of the driver is likewise capable of being set into rotation as a result of the rotary field generated by the windings and by means of the driver magnets.

Because the torque limitation, implemented by means of the driver, is located in the air gap between the stator and the rotor, the version according to the invention requires hardly more space than an identical machine without a driver. The version according to the invention decouples the electrical machine in the axial direction from a device that is to be driven and limits the maximum torque that can be transmitted. Since the torque limitation is based solely on magnetic action, this version is maximally wear-free in operation.

Advantageously, the driver is supported on the rotor shaft. For that purpose, the driver is embodied in tubular form, so that it completely surrounds the rotor. Annular tube walls are mounted on the ends of the driver tube; on the one hand, they stabilize the tubular body, and on the other they serve to receive ball bearings or cylinder bearings, for instance, that rest on the rotor shaft. Thus the interstices that exist anyway between the rotor and the stator can be utilized in the best possible way, which is highly favorable for the sake of a compact construction.

Preferably, the recesses are distributed uniformly over the circumference of the rotor surface and the driver magnets are distributed uniformly over the circumference of the inner driver face, and the protrusions between the recesses are located diametrically opposite the driver magnets. Because of the disposition of the driver magnets on the inner driver face, the mechanical connection between the driver magnets and the inner driver face is not exposed to any centrifugal forces, so that high rotary speeds of up to 30,000 rpm, depending on the structural size, are attainable.

Especially preferably, the magnets are located on the inside of the driver, corresponding to the rotor recesses; this has a favorable effect on the force transmission, since the force transmission has an influence on the maximum torque that can be transmitted.

Advantageously, the dimensions of the magnets and of the longitudinal protrusions are selected in accordance with a predetermined torque, such that if this torque is exceeded, the rpm of the rotor is reduced compared to the rpm of the driver. As a result, in the manner of a slip coupling, if the maximum allowable torque is exceeded, a torque limitation ensues. As soon as the torque is again below the defined torque, the driver snaps into place at the next possible protrusion of the rotor, because of the interaction of the magnetic field, generated by the driver magnets, and the protrusions located between the longitudinal slots, and speeds up the rotor again until the allowable maximum torque is again reached.

If a rotary-current synchronous motor with magnetic torque limitation is implemented by means of an electrical machine of the invention, then a compact structure is possible, along with protection of the mechanical components in the event of a short circuit.

If a generator with magnetic torque limitation is implemented by means of an electrical machine, then the network supplied by the generator can be protected against sudden excessive load increases. For instance, if strong gusts occur in conjunction with a wind farm that includes a generator according to the invention, then the torque limitation would be capable of decoupling the network, or the electronics connected to the generator, from voltage peaks that result from these gusts.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
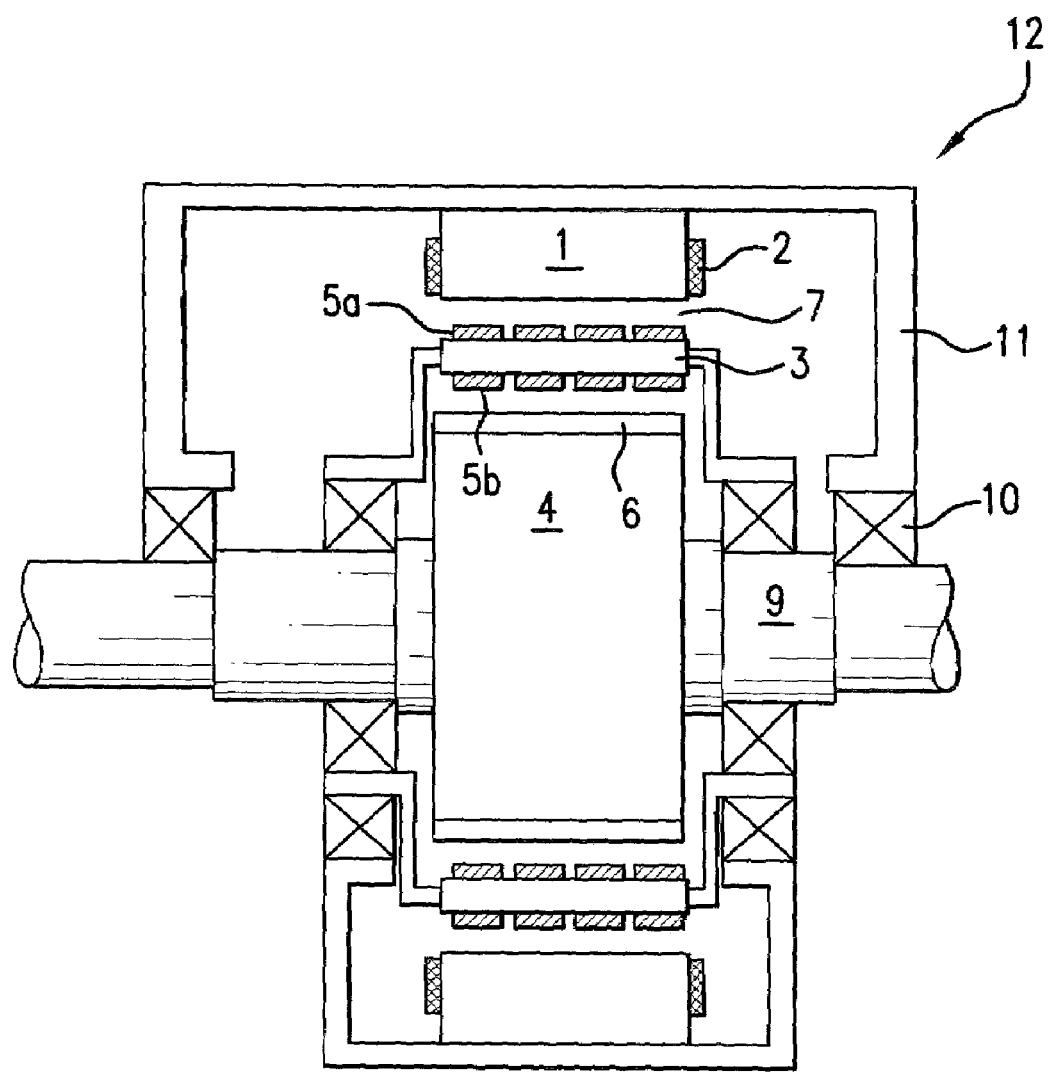
FIG. 1 is a view showing an electrical machine in accordance with the present invention in a longitudinal section.

The housing 11 of the electrical machine 12 includes a stator 1 with windings 2 and a rotor 4, supported movably relative to the stator 1, with a rotor shaft 9. Recesses 6 and protrusions 8, extending axially on the rotor surface, are distributed over the circumference. There is a driver 3, located coaxially with the rotor 4 and extending axially, in the air gap 7 between the rotor 4 and the stator 1. Exciter magnets 5a are located on the upper driver face 3a toward the stator 1, and driver magnets 5b are located on the inner driver face 3b toward the rotor 4.

The driver 3 is supported on the rotor shaft 4 by means of ball or needle bearings 10. The recesses 6 extend axially and are uniformly distributed over the circumference of the rotor surface, and the driver magnets 5b extend axially and are uniformly distributed over the circumference of the inner driver face 3b. The protrusions 8, which are present between the recesses 6, and the driver magnets 5b are diametrically opposite one another.

Figure 2:
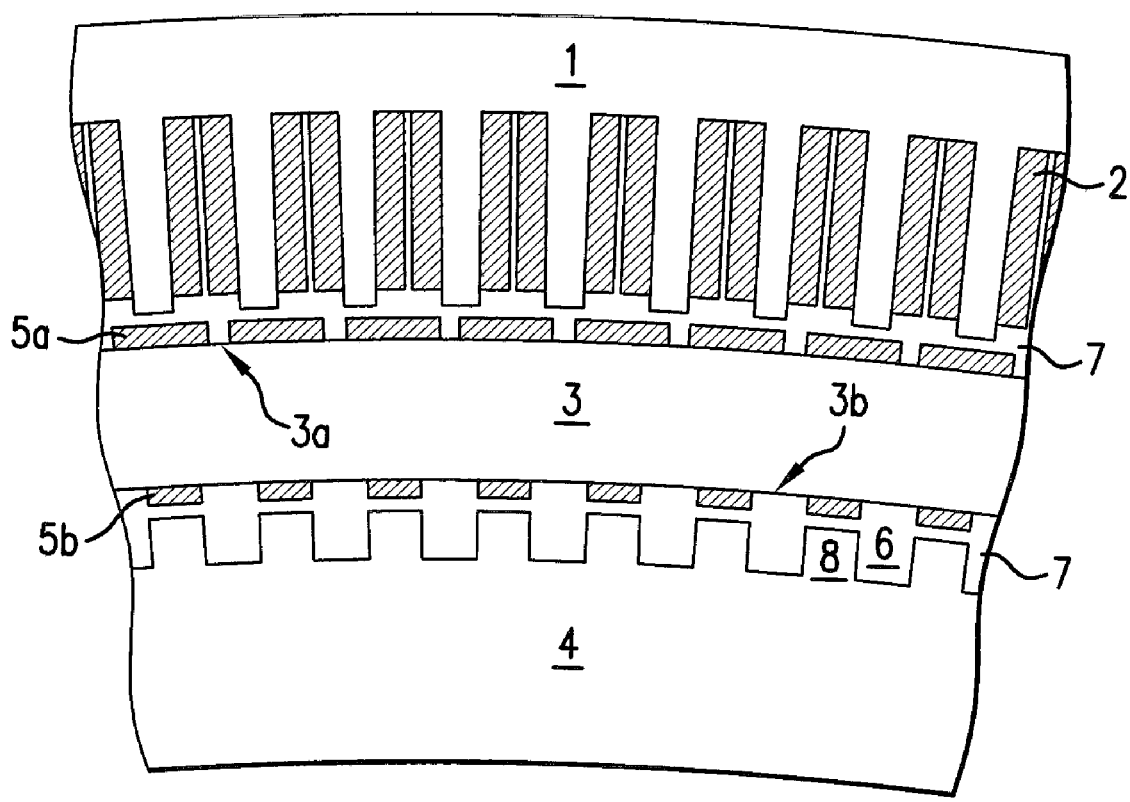
FIG. 2 is a view showing a segmental cross-section of a stator, a driver, and a rotor of the electrical machine in accordance with the present invention.

FIG. 2 shows a segmental cross section of the stator, driver, and rotor. In it, the structural characteristics according to the invention are shown in even more detail. What are shown are the rotor 1 with its windings 2, the driver 3 with its exciter magnets 5a and its driver magnets 5b, and the rotor 4 with its longitudinal slots 6 and longitudinal protrusions 8. In addition, the air gap 7 can be seen, in which the driver 3 is located.

If the driver 3 begins to rotate, because of the interaction between the rotary field and the exciter magnets 5a, then it sets the rotor 4 into motion as well, because of the forces of attraction between the driver magnets 5b and the protrusions 8. The torque is transmitted virtually without wear, up to a maximum allowable torque.

Below the maximum allowable rpm, the rotor 1, will be oriented such that because of the force of attraction of the driver magnets 5b, the protrusions 8 come to rest diametrically opposite the driver magnets 5b, since the air gap is minimal here. As soon as the maximum allowable torque is exceeded, the slip increases, and the driver 3 rotates faster than the rotor 1. With decreasing torque, the rotor protrusions 8 again snap into place correspondingly to the driver magnets 5b, and the rotary speeds are again identical.

The machines shown in FIGS. 1 and 2 may be a rotary-current synchronous motor with magnetic torque limitation, or a generator with magnetic torque limitation. The invention makes a compact structure possible that is subject to only slight wear.

It will be understood that each of the elements described above, or two or more together, may also find a useful application in other types of constructions differing from the type described above.

While the invention has been illustrated and described as embodied in an electrical machine with torque limitation, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed is:

1. An electrical machine, comprising a stator with windings; a rotor supported movably relative to said stator, said rotor having a rotor surface provided with longitudinal recesses which are distributed over a circumference and extending axially; a driver located coaxially relative to said rotor and extending axially, said driver being located in an air gap between said rotor and said stator; and exciter magnets on an upper driver face toward said stator and driver magnets on an inner driver face toward said rotor located in such a way that upon rotation of said driver, said rotor is likewise settable into rotation as a result of a rotary field generated by said windings.

2. An electrical machine as defined in claim 1, wherein said rotor has a rotor shaft, said driver being supported on said rotor shaft.

3. An electrical machine as defined in claim 1, wherein said longitudinal recesses are distributed uniformly over the circumference of said rotor surface and said driver magnets are distributed uniformly over a circumference of said inner driver face, wherein longitudinal protrusions located between said longitudinal recesses and said driver magnets are located diametrically opposite to one another.

4. An electrical machine as defined in claim 1, wherein said driver magnets are located on said inner driver face corresponding to said longitudinal recesses on said rotor surface.

5. An electrical machine as defined in claim 3, wherein said driver magnets and said longitudinal protrusions have dimensions that are dimensioned in accordance with a torque threshold value, upon exceeding of which an rpm of said rotor decreases relative to an rpm of said driver.

6. A rotary-current synchronous motor with magnetic torque limitation, implemented by an electrical machine as defined in claim 1.

7. A generator with magnetic torque limitation implemented by an electrical machine as defined in claim 1.

8. A wind farm having a generator as defined in claim 7.

* * * * *